March 7, 1967  E. W. FILEGER  3,307,292
STEERING AND CURRENT PICKUP MEANS FOR MINIATURE RACING CAR
Filed April 2, 1964  2 Sheets-Sheet 1
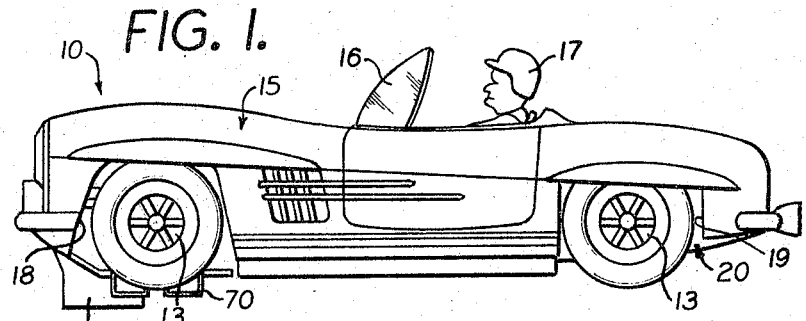
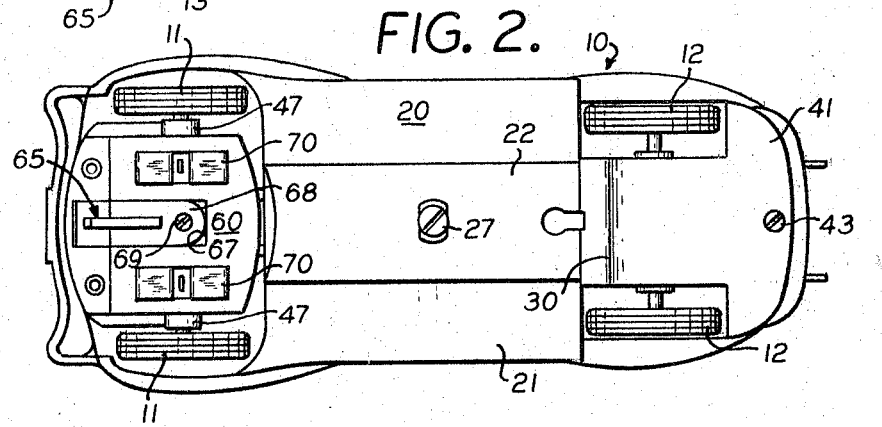
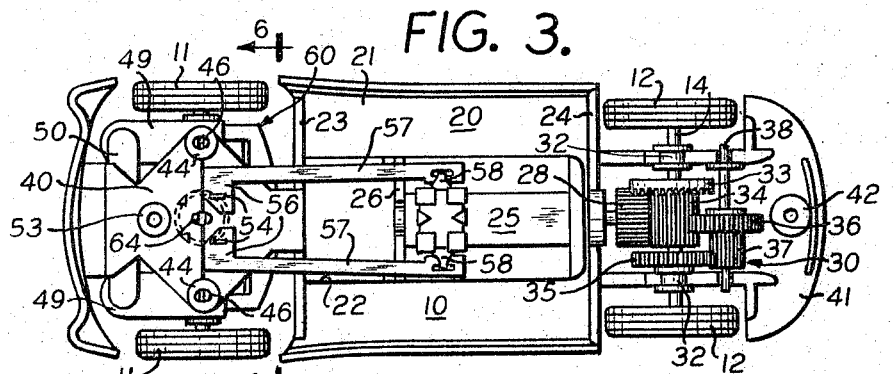
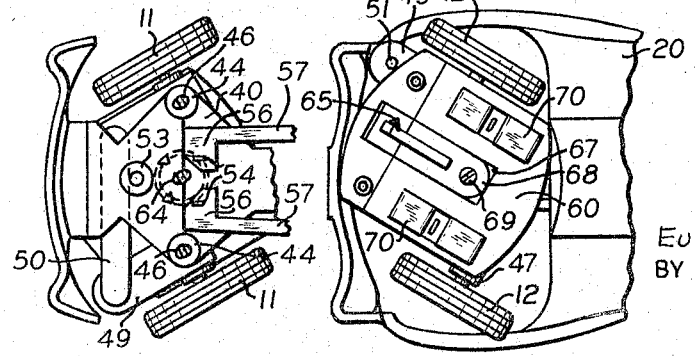
INVENTOR
EUGENE W. FILEGER
BY BLUM, MOSCOVITZ,
FRIEDMAN, BLUM &
KAPLAN.
ATTORNEYS.

March 7, 1967  E. W. FILEGER  3,307,292
STEERING AND CURRENT PICKUP MEANS FOR MINIATURE RACING CAR
Filed April 2, 1964  2 Sheets-Sheet 2

INVENTOR
EUGENE W. FILEGER.
BY- BLUM, MOSCOVITZ,
FRIEDMAN, BLUM &
KAPLAN.
ATTORNEYS.

United States Patent Office 3,307,292
Patented Mar. 7, 1967

3,307,292
STEERING AND CURRENT PICKUP MEANS
FOR MINIATURE RACING CAR
Eugene W. Fileger, Girard, Pa., assignor to Louis Marx
& Co., Inc., New York, N.Y., a corporation of New
York
Filed Apr. 2, 1964, Ser. No. 356,891
3 Claims. (Cl. 46—243)

This invention relates to miniature racing cars and, more particularly, to novel steering and current pickup means for such cars.

Miniature racing cars are electrically driven model cars which are constructed so as to simulate the appearance of racing cars. A pair of such cars is usually raced on a dual track, with each half of the dual track having a substantially flat surface simulating a roadway for engagement with rubber-tire steering and driving wheels on the miniature racing cars. In addition, each half of the dual track is provided with a guide rail or slot cooperable with suitable means on the associated car to guide the same along the track, and with a pair of electrical contact strips or rails which are energized from opposite polarity terminals of a source of A.C. or D.C. potential. These rails are engaged by suitable pickup means on the miniature racing cars so that the speed of operation thereof may be remotely controlled by, for example, varying the potential applied between the two contact rails.

In turn, each racing car includes suitable means for conducting the electric current from the contact shoes or the like to an electric motor which, through reduction gearing, drives the driving wheels of the vehicle which are usually the rear wheels thereof. Both the steering mechanisms and the current pickup shoes of known miniature racing cars have certain disadvantages. For example, in many such racing cars the current pickup shoes are fixedly mounted with respect to the motor vehicle. This is undesirable because, where the track curves, the shoes are not maintained in full surface contact with the contact rails of the track, resulting in possible loss of power. It is therefore highly desirable that the current pickup shoes be movable with the steering wheels of the vehicle, which are guided to follow curvature of the track, so that the current pickup shoes will always maintain effective contact with the current rails of the track irrespective to whether the vehicle is proceeding along a tangent track or a curved track.

In accordance with the present invention, an improved steering current pickup mechanism is provided in a novel manner, and in a manner so that the wheels are steered in the same manner as in a full size motor vehicle, whereby the steering wheels may be readily and easily turned to follow curvature of the track. Furthermore, interconnections are provided between the steering mechanism and a mounting means for the current pickup shoes so that the latter are "steered" in accordance with movement of the steering wheels of the vehicle. Thus, these pickup shoes accurately follow variations in the direction of the current pickup rails. Additional novel means are provided for conducting current from the current pickup shoes to the driving motor for the vehicle.

For an understanding of the principles of the invention, reference is made to the following description of a typical embodiment thereof as illustrated in the accompanying drawings. In the drawings:

FIG. 1 is a side elevational view of one form of racing car embodying the invention;

FIG. 2 is a bottom plan view thereof;

FIG. 3 is a top plan view of the chassis of the racing car illustrated in FIG. 1, with the body removed;

FIG. 4 is a partial top plan view of the steering mechanism of the racing car;

FIG. 5 is a bottom plan view corresponding to FIG. 4;

Figure 6:
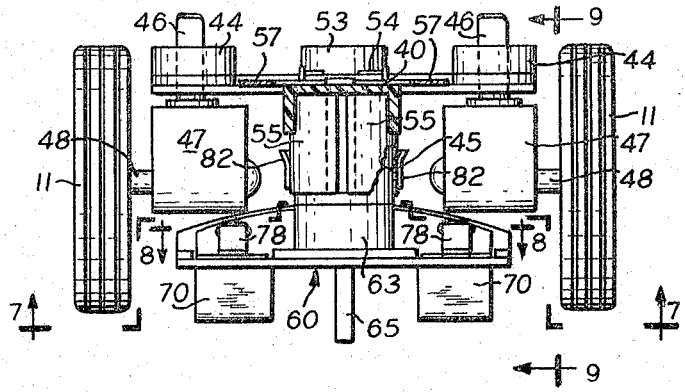
FIG. 6 is a transverse sectional view taken on the line 6—6 of FIG. 3.

Refering to FIGS. 1 through 5, the miniature racing car is illustrated at 10 as comprising a body 15 mounted upon a chassis 20. Body 15 is formed to simulate a racing car body and may, for example, include a windshield or wind screen 16 and a figure 17 to heighten the realistic effect. The body 15 may be molded of a suitable plastic composition material, with certain parts thereof being cemented to each other. The side walls or skirts of body 15 may be cut away, as at 18, for the front or steering wheels 11, and also cut away, as at 19, for the rear or driving wheels 12. Wheels 11 and 12 may be in the form of rubber tires, for good traction on the track, and may have center disks 13 of metal formed to simulate wire wheels.

Chassis 20 is also molded of a suitable relatively stiff plastic composition material and includes a substantially flat central section 21 formed with a longitudinally extending well 22, center section 21 having upright end walls 23 and 24. Well 22 has an upright partition 26 therein spaced rearwardly somewhat from front wall 23, and an electric motor 25 is positioned between partition 26 and rear wall 24. Motor 25 is anchored in position by a screw 27 engaged through an aperture in the bottom wall of well 22 and threaded into a tapped aperture in motor 25.

An upwardly opening gear case 30 extends rearwardly from wall 24 and is formed with parallel side walls 31 formed with transversely aligned arcuate recesses to receive bearings or shafts. The forward pair of these recesses seats bearings 32 rotatably supporting the rear axle 14 to which rear wheels 12 are secured. A gear unit is rotatably mounted on axle 14 intermediate bearings 32, and includes a crown gear 33, meshing with the drive or output pinion 28 of motor 25, and a relatively axially elongated pinion 34. A drive gear 35 is fixed to axle 14 adjacent the free end of pinion 34. Pinion 34 meshes with a gear 36 which is integral with a pinion 37 meshing with drive gear 35. The unit comprising gear 36 and pinion 37 is rotatably mounted on a shaft 38 which is seated in the second pair of arcuate recesses in walls 31. Bearings 32 and shaft 38 are retained in the respective pairs of arcuate recesses in walls 31 by abutments or posts formed on the inner surface of body 10 and engaging bearings 32 and shaft 38 when body 10 is assembled to chassis 20. These posts or abutments have not been shown as they form no part of the present invention. Rearwardly of gear case 30, chassis 20 includes a flat portion 41 formed with an upright tubular post 42 to receive a screw 43 (FIG. 2) which is one of the screws holding body 15 to chassis 20.

Figure 7:
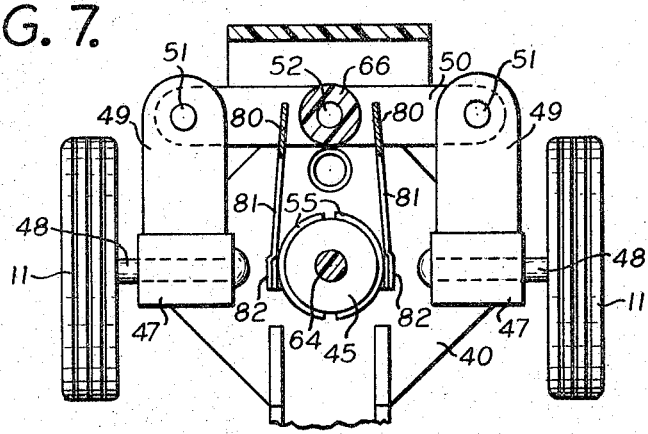
FIG. 7 is a horizontal sectional view taken on the line 7—7 of FIG. 6 and looking in the direction of the arrows.
Figure 8:
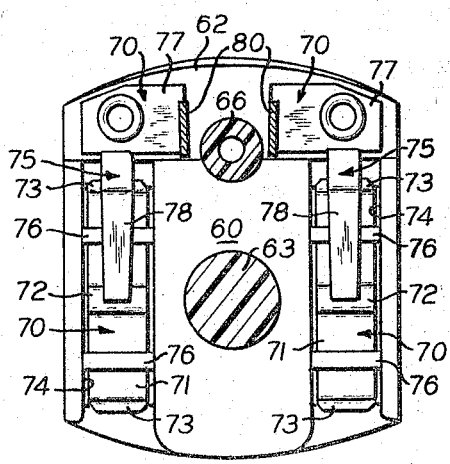
FIG. 8 is a horizontal sectional view taken on the line 8—8 of FIG. 6.

Chassis 20 is formed with a substantially flat forward extension 40 which is substantially diamond shape, and this forward extension 40 serves as a pivotal mounting for front wheels 11 and also as a mounting for the steering and current pickup means of the invention. Extension 40 is formed with a pair of laterally spaced tubular posts 44 which receive pivot pins 46 secured to bearings 47 for stub axles 48 of front wheels 11. As best seen in FIGS. 6 and 7, stub axles 48 are headed over on their inner ends. Furthermore, pins 46 have their upper ends split and diverging to form resilient fingers which anchor the pins in the tubular posts 44. Bearings 47 are formed with extension arms 49 which are apertured to receive pins 51 on the ends of a cross link 50 which thus serves to interconnect the bearings 47 for pivotal movement of wheels 11 about the axes of pins 46. Link 50 is held in position by underlying the forward part of chassis extension 40. At its center, link 50 is formed with a downwardly extending pin 52 for a purpose to be described.

A tubular boss 53 projects upwardly from the surface of extension 40 to receive a screw (not shown) for securing body 15 to chassis 20. For the purpose of pivotally supporting the combined steering and contact shoe means, extension 40 is formed with a relatively large diameter integral and downwardly extending tubular post 45. Post 45 is embraced by a pair of contact segments 55 which are diametrically opposite each other and each of which extends through somewhat less than 180 degrees. Each contact segment 55 is formed with a pair of ears 54 on its upper end which extend through apertures in platform extension 40. One ear 54 of each contact strip also extends through an aperture in a lateral extension 56 of a respective one of a pair of conductive metal strips 57, and is twisted over to electrically and mechanically anchor the respective strip 57 to the respective segment 55, which is also of electrically conductive metal. The inner ends of conductor strips 58 are formed with slits to receive projecting tongue type electric terminals 58 of motor 25. Preferably, the length of strips 57 is somewhat greater than the distance between tongues 54 and terminals 58, so that strips 57 are slightly bowed to maintain a resilient interconnection with the engaged terminals 58.

As stated, bearing post 45 forms the pivotal mounting for the combination steering and current pickup means 60. This means 60 comprises a substantially flat element of plastic composition material which includes a generally horizontal platform portion 61 and an upwardly sloping forward portion 62. Platform portion 61 has a cylindrical boss 63 thereon whose diameter is equal to that of the bearing post 45, and a pin 64 projects centrally upwardly from boss 63 and has a split end. By inserting pin 64 into the bore through boss 45, the means 60 is pivotally secured to the chassis 20. Forwardly of boss 63 there is a relatively small diameter tubular boss 66 which extends perpendicularly to portion 61, and the bore of boss 66 receives the central pin 52 on cross link 50. Thereby the means 60 is pivoted about the axis of boss 45 whenever link 50 is moved, or vice versa, whenever means 60 is swung, by means to be described, link 50 is moved laterally to steer the front wheels 11.

Such steering is accomplished by a plow 65 which is best seen in FIGS. 2, 5, 6 and 9. A substantially rectangular recess 67 is formed in the under surface of plate 61 and extends partially into beveled plate 62, and recess 67 receives and nests a flange 68 extending along the upper edge of plow 65. The plow is anchored in the recess by a screw 69 extending through an aperture in flange 68. Plow 65 is arranged to extend into a guiding slot generally formed centrally of the track over which the miniature racing car operates. Thus, plow 65 follows the lateral undulations of such a track, and will correspondingly swing the steering and pickup means 60 about the axis of pin 64, thereby move link 50 laterally to steer the wheels 11.

The operating voltage for the miniature racing car is picked up from the contact rails of the track by contact shoes generally indicated at 70. Each contact shoe is a strip of relatively resilient, electrically conductive material such as copper or brass, and includes a pair of rectangular channel sections 71 having their adjacent flanges interconnected by a strip 72. The outer flanges are formed with outwardly projecting lips 73. To mount contact shoes 70, platform portion 61 is formed with a pair of relatively elongated rectangular apertures 74 therein, one adjacent each side thereof. Three cross strips 76 extend across each of the apertures 74. Shoes 70 are positioned in place by inserting each of the channel sections 71 between center strip 76 and the ends of the recess, so that portion 72 of each contact shoe 70 overlies the center cross strip and the flanges 73 of each contact shoe engage over the upper surface of platform portion 61 at each end of a slot 74.

Figure 9:
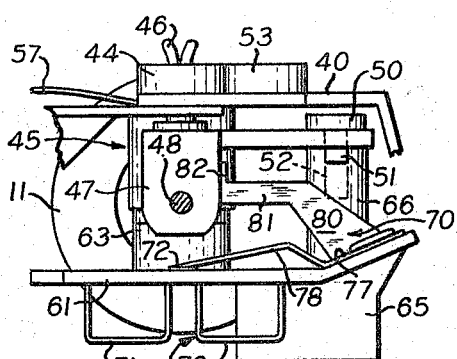
FIG. 9 is a vertical sectional view taken on the line 9—9 of FIG. 6.

Electrical connection of contact shoes 70 to contact segments 55 on post 45 is effected by means generally indicated at 75, and which also acts to provide a spring bias urging contact shoes 70 downwardly. Each connection and biasing means 75 includes a base portion 77 which is riveted or the like to the sloping portion 62 of the steering mechanism 60. An integral spring finger 78 extends rearwardly from each base portion 77, and has a reduced lip on its free end engaged in a slot in the portion 73 of the associated contact shoe 70. As best seen in FIG. 9, the spring fingers 78 are angular in elevation so as to exert a downward bias upon the associated contact shoe 70.

A brush 80 extends from the edge of each base portion 77 adjacent post 66, and brush 80 is integral with the base portion, these brushes 80 comprising strips of electrically conductive metal which are disposed substantially at right angles to the associated base portion 77. Each brush 80 extends perpendicularly to the associated base portion 77 and has a relatively elongated finger 81 which extends substantially parallel to platform portion 61 and has a contact end 82 in electrical engagement with a respective contact segment 55. Thus, there is established an electrical connection from contact shoes 70 through connection means 75, brushes 80, contact segments 55, strips 57, and terminals 58 to motor 25. Thereby the speed and movement of the miniature racing vehicle may be remotely controlled by controlling the voltage applied to the contact strips of the tracks upon which it operates.

Furthermore, inasmuch as contact shoes 70 and their connections are mounted upon steering means 60, it will be observed that the contact shoes are always kept in precise longitudinal alignment with the contact strips of the track upon which the car operates, as the contact shoes are turned in accordance with turning of the steering wheels 11 responsive to guided movement of plow 65.

While a specific embodiment of the invention has been shown and described in detail to illustrate the application of the principles of the invention, it will be understood that the invention may be embodied otherwise without departing from such principles.

What is claimed is:

1. In a miniature racing vehicle, a chassis; driving and steering wheels rotatably mounted on and supporting said chassis for movement of the vehicle along a track having a central guiding slot and a pair of contact rails each adjacent one side of said slot; an electric motor on said chassis; gearing connecting said motor to said driving wheels; a pair of stub axles rotatably mounting said steering wheels and pivotally mounted on said chassis; a link interconnecting said stub axles for conjoint movement of said steering wheels; a steering member pivoted to said chassis at a point spaced longitudinally from said link, and pivotally connected to said link intermediate the ends of the latter; a plow on said member engageable in the track slot to pivot said member to follow the track and to steer said steering wheels; and current pickup means engageable with the contact rail and electrically connected to said motor; the pivotal connection between said chassis and said steering member comprising a cylindrical tubular post and a pin engaged within said post; said current pickup means including a pair of contact segments on the outer surface of said post and each extending through less than 180 degrees; brush means engaged with said contact segments; a pair of contact shoes on said steering member engageable with said contact rails; and means electrically connecting said motor and said contact shoes to said contact segments and brush means for electrically connecting said contact shoes to said motor through said contact segments and brush means.

2. In a miniature racing vehicle, as claimed in claim 1, said steering member including a substantially flat plate portion formed with a pair of laterally spaced longitudinally extending slots; each of said contact shoes being mounted in one of said slots to project from the under surface of said plate portion; said brush means including a pair of resilient conductors each fixedly connected to said plate portion at one end and having a free end bearing against a respective contact shoe and maintaining the same under resilient pressure in engagement with the associated contact rail.

3. In a miniature racing vehicle, as claimed in claim 2, said tubular post being on the under side of said plate portion; each of said contact segments having a tongue extending through an aperture in said plate portion to project from the upper surface thereof; a pair of electrically conductive metal conductor strips each secured at one end to a respective one of said tongues and each engaged at the opposite end in the respective terminal of said motor.

References Cited by the Examiner
UNITED STATES PATENTS 3,086,319  4/1963  Frisbie et al. _____ 46—244
3,163,123  12/1964  Ziroli _____ 46—222

RICHARD C. PINKHAM, *Primary Examiner.*

DELBERT B. LOWE, *Examiner.*

R. E. CUTTING, *Assistant Examiner.*